(12) United States Patent
Chen et al.

(10) Patent No.: US 12,354,769 B1
(45) Date of Patent: Jul. 8, 2025

(54) MAGNETIC ATTRACTION LINE CONVENIENT TO STORE

(71) Applicant: Chuangguan Technology Group (Dongguan) Co., Ltd., Dongguan (CN)

(72) Inventors: Chuangxin Chen, Huanggang (CN); Yung-Cheng Lin, Taipei (CN)

(73) Assignee: Chuangguan Technology Group (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 18/979,031

(22) Filed: Dec. 12, 2024

(30) Foreign Application Priority Data

May 22, 2024 (CN) .......................... 202421128341.2

(51) Int. Cl.
| | |
|---|---|
| *H01B 7/06* | (2006.01) |
| *H01B 7/18* | (2006.01) |
| *H01B 7/40* | (2006.01) |
| *H01F 1/059* | (2006.01) |
| *H01F 7/02* | (2006.01) |

(52) U.S. Cl.
CPC ............ *H01B 7/06* (2013.01); *H01B 7/1875* (2013.01); *H01B 7/40* (2013.01); *H01F 1/059* (2013.01); *H01F 7/0215* (2013.01)

(58) Field of Classification Search
CPC . H01B 7/06; H01B 7/065; H01B 7/40; H01B 7/0275; H04R 1/1033
See application file for complete search history.

(56) References Cited

U.S. PATENT DOCUMENTS

| | | | |
|---|---|---|---|
| 11,756,703 B1* | 9/2023 | Yue ...................... | H01B 7/0275 |
| | | | 174/74 R |
| 11,929,191 B1* | 3/2024 | Yue ................... | B29C 45/14008 |
| 11,972,881 B1* | 4/2024 | Hanna ...................... | H01B 7/40 |
| 2021/0098156 A1* | 4/2021 | Chen ...................... | H01B 17/58 |
| 2024/0145121 A1* | 5/2024 | Erlendsson ............ | D07B 1/025 |
| 2024/0161975 A1* | 5/2024 | Maehara ............. | H01F 41/0273 |

FOREIGN PATENT DOCUMENTS

| | | |
|---|---|---|
| CN | 207677162 U | 7/2018 |
| CN | 111463608 A | 7/2020 |
| CN | 216252012 U | 4/2022 |

\* cited by examiner

*Primary Examiner* — Timothy J Thompson
*Assistant Examiner* — Amol H Patel
(74) *Attorney, Agent, or Firm* — Nitin Kaushik

(57) ABSTRACT

The present invention relates to the technical field of magnetic attraction lines, and in particular, to a magnetic attraction line convenient to store, including a line body and a connector, where line cores are connected into the line body, outer surfaces of the line cores are covered with an injection molding layer, an outer surface of the injection molding layer is coated with a magnetic attraction layer, an outer surface of the magnetic attraction layer is coated with a protection layer, and an isolation and protection layer is disposed between the magnetic attraction layer and the injection molding layer. Through a coating connection between the magnetic attraction layer and the injection molding layer, and under the action of the magnetic attraction layer, a magnetic attraction connection effect of the line bodies is achieved, and then a magnetic storage effect of the line bodies is achieved.

6 Claims, 4 Drawing Sheets

MAGNETIC ATTRACTION LINE CONVENIENT TO STORE

CROSS-REFERENCE TO RELATED APPLICATIONS

The application claims priority to Chinese patent application No. 2024211283412, filed on May 22, 2024, the entire contents of which are incorporated herein by reference.

TECHNICAL FIELD

The present invention relates to the technical field of magnetic attraction lines, and in particular, to a magnetic attraction line convenient to store.

BACKGROUND

A data line is a commonly used charging assembly for electronic devices. The data line is long, and is generally piled up and wound together when being carried. Consequently, the data line is often required to be unwound when being used, which is very troublesome, and piling up and winding the data line affect aesthetics and occupy space. An existing data line on the market generally has a defect of inconvenient storage, the data line is messy in a storage state due to a characteristic of flexibility when the data line is in an idle state, and the messy data line not only encroaches a larger storage space, but also seriously affects a user to obtain other articles in the same space, which is inconvenient to use, very messy in vision, and poor in use experience.

SUMMARY

An objective of the present invention is to provide a magnetic attraction line convenient to store, so as to solve problems in the above background that the messy data line not only encroaches a larger storage space, but also seriously affects a user to obtain other articles in the same space, which is inconvenient to use, very messy in vision, and poor in use experience.

To achieve the above objective, the present invention provides a technical solution as follows: a magnetic attraction line convenient to store, including a line body and a connector, where line cores are connected into the line body, outer surfaces of the line cores are covered with an injection molding layer, an outer surface of the injection molding layer is coated with a magnetic attraction layer, an outer surface of the magnetic attraction layer is coated with a protection layer, and an isolation and protection layer is disposed between the magnetic attraction layer and the injection molding layer.

Preferably, the line body is strip-shaped, and an outer surface of the line body is coated with the protection layer.

Preferably, the protection layer is made of synthetic rubber, and the magnetic attraction layer is made of samarium iron nitride.

Preferably, the isolation and protection layer is distributed between the magnetic attraction layer and the injection molding layer in a strip-shaped cross manner, the outer surface of the magnetic attraction layer is directly coated with the protection layer, and the isolation and protection layer is made of a material including a Kevlar fiber, a nylon fiber, a cotton fiber, aluminum foil, and a graphene strip.

Preferably, the line cores are directly embedded in the injection molding layer, and an outer surface of the protection layer is sheathed with a protection sleeve.

Preferably, the protection sleeve is made of a material including a cotton yarn, a polyester fiber, a nylon fiber, a Kevlar fiber, silicone, and rubber, and the protection sleeve is distributed in a grid shape, and the connector includes a USB connector, a TYPE C connector, a Lightning connector, and an audio connector.

Compared with the prior art, the present invention has the following beneficial effects:

1. Through connections between the line cores and the injection molding layer, and under the action of the injection molding layer, a protection effect of fixing and using action positions of the line cores is achieved; through a coating connection between the magnetic attraction layer and the injection molding layer, and under the action of the magnetic attraction layer, a magnetic attraction connection effect of the line bodies is achieved, and then a magnetic storage effect of the line bodies is achieved; under a connection between the magnetic attraction layer and the isolation and protection layer, and under the action of the isolation and protection layer, the isolation and protection layer has the advantages of low density, high strength, good toughness, high temperature resistance and easy processing and forming; and under the action of the protection sleeve on the protection layer, a use performance and a tensile effect of the line body are improved.

Figure 1:
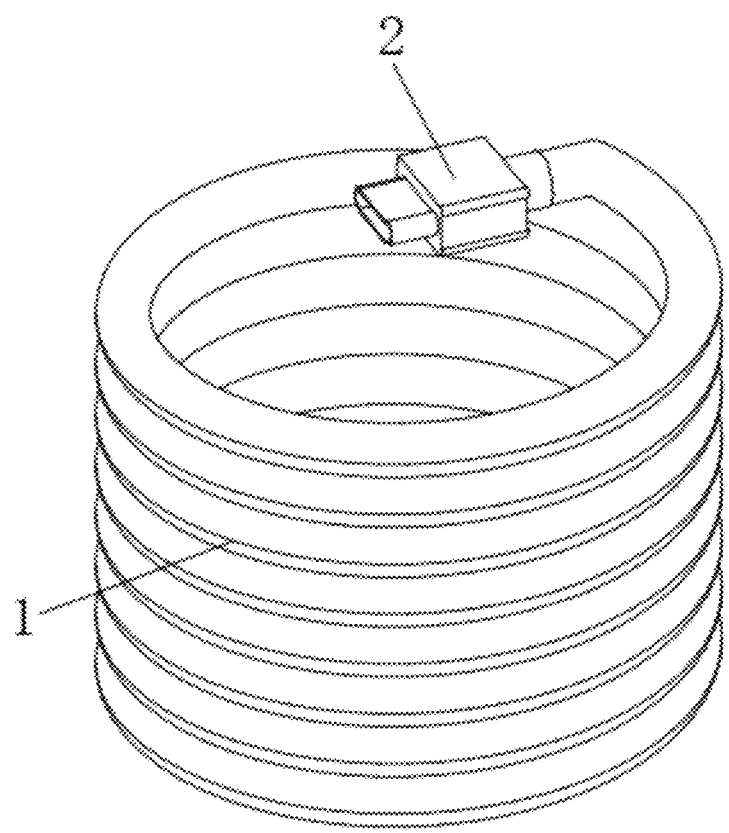
FIG. 1 is a stereo schematic structural diagram of a storage state of the present invention.

Reference numerals: 1, Line body; 2, Connector; 3, Protection layer; 4, Magnetic attraction layer; 5, Isolation and protection layer; 6, Injection molding layer; 7, Line core.

DETAILED DESCRIPTION OF THE EMBODIMENTS

An explicit and complete description of the technical solution in the embodiments of the present invention is given below in conjunction with the accompanying drawings in the embodiments of the present invention. Apparently, the described embodiments are merely a part of the embodiments of the present invention, not all of the embodiments. Based on the embodiments in the present invention, all other embodiments obtained by those of ordinary skill in the art without making creative labor fall within the scope of protection of the present invention.

Figure 2:
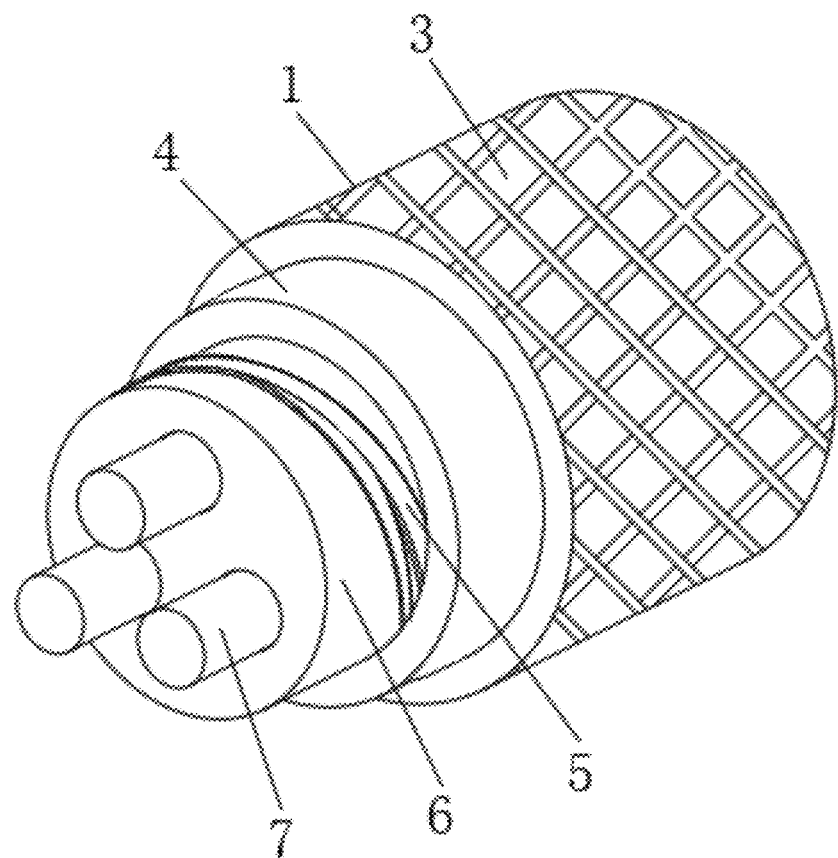
FIG. 2 is a stereo schematic structural diagram of a line body according to the present invention.
Figure 3:
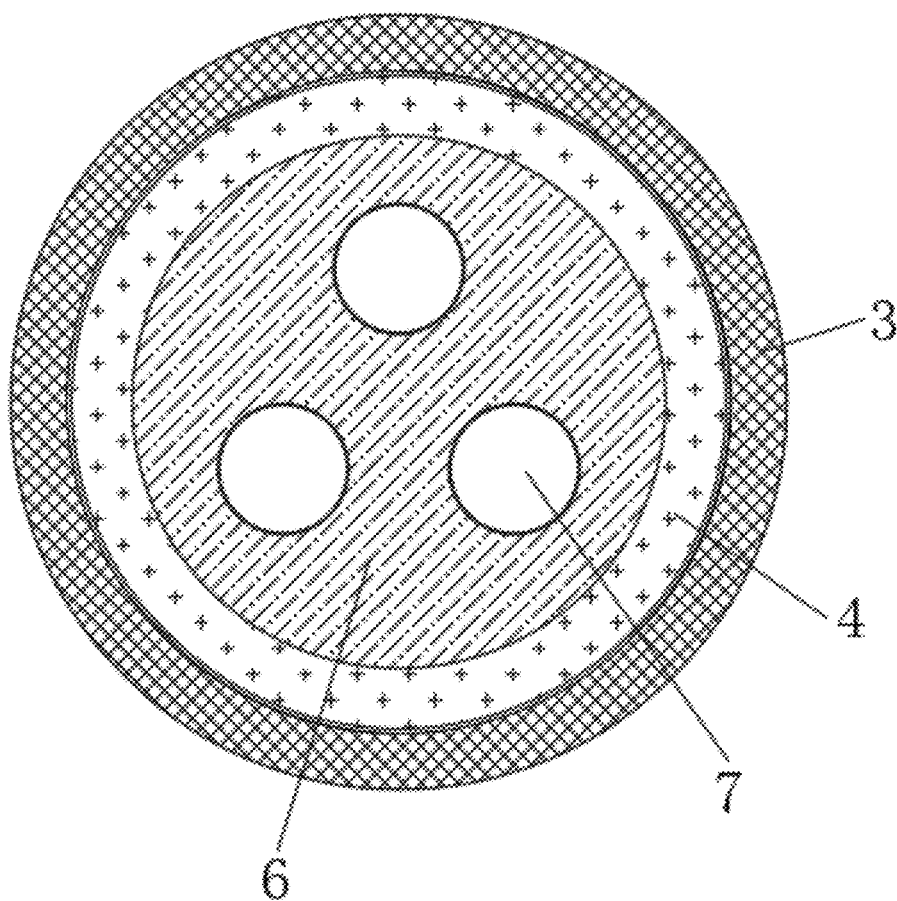
FIG. 3 is a schematic structural diagram of the present invention.
Figure 4:
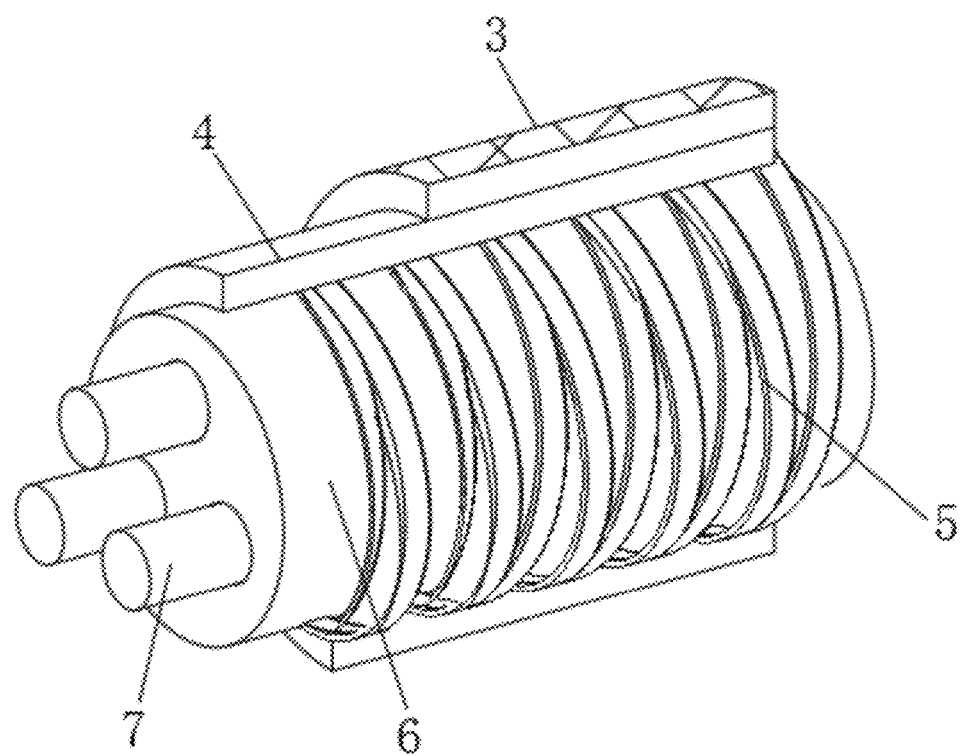
FIG. 4 is a partial stereo sectional schematic diagram of a connection structure of a protection layer and a magnetic attraction layer according to the present invention.

Referring to FIGS. 1 to 4, the present invention provides an embodiment as follows:

A magnetic attraction line convenient to store, including a line body 1 and a connector 2, where line cores 7 are connected into the line body 1, outer surfaces of the line cores 7 are covered with an injection molding layer 6, an outer surface of the injection molding layer 6 is coated with a magnetic attraction layer 4, an outer surface of the magnetic attraction layer 4 is coated with a protection layer 3, and an isolation and protection layer 5 is disposed between the magnetic attraction layer 4 and the injection molding layer 6; through connections between the line cores 7 and the injection molding layer 6, and under the action of the protection layer 3 and the magnetic attraction layer 4, a protection effect on the line cores 7 is achieved; and under the action of the magnetic attraction layer 4, a magnetic adsorption operation of the line bodies 1 is facilitated.

Furthermore, the line body 1 is strip-shaped, and an outer surface of the line body 1 is coated with the protection layer 3; and through a coating connection between the protection layer 3 and the line body 1, and under the action of the protection layer 3, a use range performance and an effect of the line body 1 are achieved.

Furthermore, the protection layer 3 is made of synthetic rubber, and the magnetic attraction layer 4 is made of samarium iron nitride, achieving the characteristics of rust prevention, oxidation resistance, saline-alkali resistance, corrosion resistance and the like; through a coating connection between the protection layer 3 and the magnetic attraction layer 4, and under the action of the protection layer 3, the protection layer 3 has excellent heat resistance, cold resistance and corrosion resistance, is less affected by environmental factors, is a synthetic rubber material, and is suitable for normal use between minus 60 degrees centigrade and 250 degrees centigrade.

Furthermore, the isolation and protection layer 5 is distributed between the magnetic attraction layer 4 and the injection molding layer 6 in a strip-shaped cross manner, the outer surface of the magnetic attraction layer 4 is directly coated with the protection layer 3, the isolation and protection layer 5 is made of a material including a Kevlar fiber, a nylon fiber, a cotton fiber, aluminum foil, and a graphene strip, and under the action of the isolation and protection layer 5, an effect of enhancing overall strength of the line body 1 is achieved.

Furthermore, the line cores 7 are directly embedded in the injection molding layer 6, and an outer surface of the protection layer 3 is sheathed with a protection sleeve; and through the connections between the line cores 7 and the injection molding layer 6, and under the action of the injection molding layer 6, an effect of supporting and protecting action positions of the line cores 7 in the line body 1 is achieved.

Furthermore, the protection sleeve is made of a material including a cotton yarn, a polyester fiber, a nylon fiber, a Kevlar fiber, silicone, rubber and the like, and the protection sleeve is distributed in a grid shape, and the connector 2 includes a USB connector, a TYPE C connector, a Lightning connector, and an audio connector; and under the action of the protection sleeve on the protection layer 3, the protection layer 3 improves wear resistance of the line body 1, has the advantages of light weight, excellent wrinkle resistance, good air permeability, good durability, dyeability and heat setting, and greatly enhances a use performance and a tensile effect of the line body 1; and under the action of the connector 2, a use range of a data line is extended.

A working principle is as follows: through connections between the line cores 7 and the injection molding layer 6, and under the action of the injection molding layer 6, an effect of supporting action positions of the line cores 7 in the line body 1 is achieved; through a connection between the injection molding layer 6 and the magnetic attraction layer 4, and under the action of the magnetic attraction layer 4, a magnetic attraction effect of the line bodies 1 is achieved, and a storage and use state and a performance of the line body 1 are improved; under the action of the isolation and protection layer 5, an overall performance of the line body 1 is improved; and under the action of the protection layer 3 and the protection sleeve thereof, use wear resistance and a tensile property of the line body 1 are improved.

It will be apparent to those skilled in the art that the present invention is not limited to the details of the above exemplary embodiments, and that the present invention can be embodied in other specific forms without departing from the spirit or essential characteristics of the present invention. The embodiments are therefore to be considered in all respects as illustrative and not restrictive, the scope of the present invention being indicated by the appended claims rather than by the above description, and all changes which fall within the meaning and scope of equivalency of the claims are therefore intended to be embraced therein. Any reference numerals in the claims shall not be construed as limiting the claim involved.

What is claimed is:

1. A magnetic attraction line convenient to store, comprising:
a line body (1) and a connector (2), wherein line cores (7) are connected into the line body (1), outer surfaces of the line cores (7) are covered with an injection molding layer (6), an outer surface of the injection molding layer (6) is coated with a magnetic attraction layer (4), an outer surface of the magnetic attraction layer (4) is coated with a protection layer (3), and an isolation and protection layer (5) is disposed between the magnetic attraction layer (4) and the injection molding layer (6), wherein the isolation and protection layer (5) is distributed between the magnetic attraction layer (4) and the injection molding layer (6) in a strip-shaped cross manner.

2. The magnetic attraction line convenient to store according to claim 1, wherein the line body (1) is strip-shaped, and an outer surface of the line body (1) is coated with the protection layer (3).

3. The magnetic attraction line convenient to store according to claim 1, wherein the protection layer (3) is made of synthetic rubber, and the magnetic attraction layer (4) is made of samarium iron nitride.

4. The magnetic attraction line convenient to store according to claim 1, wherein the outer surface of the magnetic attraction layer (4) is directly coated with the protection layer (3), and the isolation and protection layer (5) is made of a material including a Kevlar fiber, a nylon fiber, a cotton fiber, aluminum foil, and a graphene strip.

5. The magnetic attraction line convenient to store according to claim 1, wherein the line cores (7) are directly embedded in the injection molding layer (6), and an outer surface of the protection layer (3) is sheathed with a protection sleeve.

6. The magnetic attraction line convenient to store according to claim 5, wherein the protection sleeve is made of a material including a cotton yarn, a polyester fiber, a nylon fiber, a Kevlar fiber, silicone and rubber, and the protection sleeve is distributed in a grid shape, and the connector (2) comprises a USB connector, a TYPE C connector, a Lightning connector, and an audio connector.

* * * * *